(12) United States Patent
Moradi Khou et al.

(10) Patent No.: US 11,414,346 B2
(45) Date of Patent: Aug. 16, 2022

(54) CEMENT COMPOSITIONS BASED ON AMORPHOUS BAGASSE ASH

(71) Applicants: Amir Bahador Moradi Khou, Fardis (IR); Alireza Esparham, Tehran (IR)

(72) Inventors: Amir Bahador Moradi Khou, Fardis (IR); Alireza Esparham, Tehran (IR)

(*) Notice: Subject to any disclaimer, the term of this patent is extended or adjusted under 35 U.S.C. 154(b) by 0 days.

(21) Appl. No.: 16/985,599

(22) Filed: Aug. 5, 2020

(65) Prior Publication Data
US 2020/0361820 A1 Nov. 19, 2020

Related U.S. Application Data

(60) Provisional application No. 62/883,134, filed on Aug. 6, 2019.

(51) Int. Cl.
| | |
|---|---|
| C04B 18/10 | (2006.01) |
| C04B 22/00 | (2006.01) |
| C04B 22/06 | (2006.01) |
| C04B 22/10 | (2006.01) |
| C04B 7/32 | (2006.01) |
| C04B 28/00 | (2006.01) |

(52) U.S. Cl.
CPC ............ *C04B 7/32* (2013.01); *C04B 18/101* (2013.01); *C04B 22/004* (2013.01); *C04B 22/064* (2013.01); *C04B 22/106* (2013.01); *C04B 28/006* (2013.01)

(58) Field of Classification Search
CPC ....... C04B 7/32; C04B 18/101; C04B 22/004; C04B 22/064; C04B 22/106; C04B 28/006; C04B 18/10; C04B 22/00; C04B 22/06; C04B 22/10; Y02P 40/10; Y02W 30/91

USPC ........................................................ 106/692
See application file for complete search history.

(56) References Cited

PUBLICATIONS

Tippayasam et al. "Geopolymer development by powders of metakaolin and wastes in Thailand." In Advances in Science and Technology (vol. 69, pp. 63-68). (Year: 2010).*
Wongkeo, W. (2017). Effect of Calcium Carbonate on Compressive Strength and Physical Properties of Alkali-Activated Lightweight Concrete. In Key Engineering Materials (vol. 751, pp. 550-555). Trans Tech Publications Ltd. (Year: 2017).*
Modolo, R. C. E., Senff, L., Labrincha, J. A., Ferreira, V. M., & Tarelho, L. A. C. (2014). Lime mud from cellulose industry as raw material in cement mortars. Materiales de Construccion, 64(316), e033-e033. (Year: 2014).*
Teixeira, S. R., Magalhaes, R. D. S., Arenales, A., Souza, A. E. D., Romero, M., & Rincon, J. M. (2014). Valorization of sugarcane bagasse ash: Producing glass-ceramic materials. Journal of Environmental Management, 134, 15-19. (Year: 2014).*

(Continued)

*Primary Examiner* — Kevin E Yoon
*Assistant Examiner* — Marites A Guino-O Uzzle
(74) *Attorney, Agent, or Firm* — Bajwa IP Law Firm; Haris Zaheer Bajwa

(57) ABSTRACT

A cement composition including a dry phase and a liquid phase. The dry phase includes an aluminosilicate source, including amorphous bagasse ash with a concentration between 40 wt. % and 100 wt. % of the weight of the dry phase. The liquid phase includes at least one of water and an alkaline activator solution. The alkaline activator solution includes at least one of an alkali metal stearate, an alkali metal silicate, and an alkali metal hydroxide.

13 Claims, 10 Drawing Sheets

(56) References Cited

PUBLICATIONS

Damidot, D., Lothenbach, B., Herfort, D., & Glasser, F. P. (2011). Thermodynamics and cement science. Cement and Concrete Research, 41(7), 679-695. (Year: 2011).*

Al Bakri, A. M., Kamarudin, H., Bnhussain, M., Liyana, J., & Ghazali, C. M. R. (2013). Nano geopolymer for sustainable concrete using fly ash synthesized by high energy ball milling. In Applied Mechanics and Materials (vol. 313, pp. 169-173). Trans Tech Publications Ltd. (Year: 2013).*

Hussam A, Narayanan N, Novel synthesis of lightweight geopolymer matrices from fly ash through carbonate-based activation, Materials Today Communications, V.17, 2018, pp. 266-277. DOI:10.1016/j.mtcomm.2018.09.014 (Year: 2018).*

\* cited by examiner

CEMENT COMPOSITIONS BASED ON AMORPHOUS BAGASSE ASH

CROSS-REFERENCE TO RELATED APPLICATION

This application claims the benefit of priority from U.S. Provisional Patent Application Ser. No. 62/883,134, filed on Aug. 6, 2019, and entitled "HYDRAULIC AND GEOPOLYMER TYPES OF CEMENT BASED ON BAGASSE ASH AND WASTE LIME MUD," which is incorporated herein by reference in its entirety.

TECHNICAL FIELD

The present disclosure generally relates to cement and concrete compositions, particularly to hydraulic and geopolymer cement compositions, and more particularly to a method for producing hydraulic and geopolymer cement compositions based on amorphous bagasse ash and lime mud.

BACKGROUND

Concrete is a composite material composed of fine and coarse aggregates bonded together with a cement composition that hardens over time. Concretes are the most widely consumed material after water in the construction industry. However, the production process of ordinary Portland cement (OPC) as the main component of conventional concretes has major shortcomings, such as high carbon dioxide production which provokes serious environmental concerns, using mineral raw material, high energy consumption, and unsatisfactory compressive strength and chemical resistance under various environmental conditions.

Waste material is one of the alternatives for conventional OPC in the production of hydraulic and geopolymer cement compositions. Millions of tons of waste materials are produced annually in various industries in the world and have time-consuming and costly recycling operations. Sugar production is one of these industries that produces a lot of waste material such as bagasse and waste lime mud which have become one of the main environmental problems in areas around these factories. Bagasse remains after the process of taking sugar juice from sugar cane and includes a high volume of the entire cultivated product, which means a high volume of waste that is very difficult to manage. Hydrated lime is used to refine sugar juice in sugar factories and waste lime mud from refining unit filters is removed from the production line and collected as waste at the end of the production process.

However, there are several technical problems in utilizing bagasse ash and waste lime mud for producing hydraulic and geopolymer cement compositions, such as low reactivity, high impurity content, and reducing compressive strength of concretes in high concentrations of these waste materials. Therefore, these technical problems lead to limited use of these waste products as additives with a low concentration, less than about 10% of cement composition, only in combination with hydraulic cement compositions like OPC. Also, geopolymer cement compositions containing bagasse ash have low compressive strength. Moreover, there are several technical problems for producing amorphous bagasse ash using an ash-making process.

Therefore, there is a need for cost-effective, high strength, and high-performance hydraulic and geopolymer cement compositions based on bagasse ash and waste lime mud with ease of implementation. Also, there is a need for a method for producing hydraulic and geopolymer cement compositions based on bagasse ash and waste lime mud without carbon dioxide production, high energy consumption, and environmental problems.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary cement composition including a dry phase and a liquid phase. In an exemplary embodiment, the dry phase may include an aluminosilicate source including amorphous bagasse ash with a concentration between about 40 wt. % and about 100 wt. % of the weight of the dry phase. In an exemplary embodiment, the liquid phase may include at least one of water and an alkaline activator solution. In an exemplary embodiment, the alkaline activator solution may include at least one of an alkali metal stearate, an alkali metal silicate, and an alkali metal hydroxide.

In an exemplary embodiment, the dry phase may further include lime mud with a concentration between about 25 wt. % and about 55 wt. % of the weight of the dry phase. In an exemplary embodiment, the dry phase may further include a carbonate including at least one of potassium carbonate, sodium carbonate, potassium bicarbonate, and sodium bicarbonate with a concentration of the carbonate between about 5 wt. % and about 35 wt. % of the weight of the dry phase. In an exemplary embodiment, the dry phase may include the amorphous bagasse ash, the lime mud, and the carbonate with a weight ratio of the amorphous bagasse ash:the lime mud:the carbonate between about 2:2:1 and about 5:3:2.

In an exemplary embodiment, the liquid phase may include an alkaline activator solution. In an exemplary embodiment, the alkali metal stearate may include at least one of sodium stearate, potassium stearate, and calcium stearate with a concentration of the stearate between about 5 wt. % and about 40 wt. % of the weight of the dry phase. In an exemplary embodiment, the alkali metal hydroxide may include at least one of sodium hydroxide, potassium hydroxide, calcium hydroxide, barium hydroxide, aluminum hydroxide, lithium hydroxide, cesium hydroxide, and magnesium hydroxide with a concentration of the alkali metal hydroxide between about 5 wt. % and about 40 wt. % of the weight of the dry phase.

In an exemplary embodiment, the alkaline activator solution may include the alkali metal stearate and the alkali metal hydroxide with a weight ratio of the alkali metal stearate to the alkali metal hydroxide between about 0.5 and about 4. In an exemplary embodiment, the alkali metal silicate may include at least one of sodium silicate and potassium silicate with a concentration between about 10 wt. % and about 50 wt. % of the weight of the dry phase. In an exemplary embodiment, the amorphous bagasse ash may include nano-sized amorphous bagasse ash with a particle size between about 20 nm and about 100 nm. In an exemplary embodiment, the cement composition may further include an additive including at least one of a nanomaterial, natural and artificial pozzolans, natural and synthetic fibers, resins, epoxies, plaster, stone powders, perlite, light aggregates, artificial aggregates, rubber and plastic powder, carbon particles, a rheology modifier, natural and artificial fillers, a polymeric adhesive, an emulsion adhesive, a rapid hardening additive, and a slow hardening additive.

In another general aspect, the present disclosure describes an exemplary method for producing a cement composition. The method may include obtaining a dry phase by forming an aluminosilicate source containing amorphous bagasse ash with a concentration between 40 wt. % and 100 wt. % of the weight of the dry phase and activating the dry phase by forming a mixture through mixing the dry phase with a liquid phase. In an exemplary embodiment, the liquid phase may include at least one of water and an alkaline activator solution. In an exemplary embodiment, the alkaline activator solution may include at least one of an alkali metal stearate, an alkali metal silicate, and an alkali metal hydroxide.

In an exemplary embodiment, forming the aluminosilicate source containing the amorphous bagasse ash may include forming bagasse ash by burning bagasse and obtaining the amorphous bagasse ash by cooling the bagasse ash by indirectly putting the bagasse ash in contact with a coolant. In an exemplary embodiment, burning the bagasse may include burning the bagasse at a temperature between about 400° C. and about 1300° C. for a time period between about 1 hour and about 8 hours. In an exemplary embodiment, mixing the dry phase with the liquid phase may include mixing the dry phase with the liquid phase with a weight ratio of the dry phase to the liquid phase between about 40%:60% and about 95%:5%.

In an exemplary embodiment, obtaining the dry phase may further include adding lime mud to the aluminosilicate source with a weight ratio of the lime mud to the aluminosilicate source between about 40:60 and about 60:40. In an exemplary embodiment, obtaining the dry phase may further include adding a carbonate to the aluminosilicate source. In an exemplary embodiment, the carbonate may include at least one of potassium carbonate, sodium carbonate, potassium bicarbonate, and sodium bicarbonate with a concentration between about 5 wt. % and about 35 wt. % of the weight of the dry phase.

In an exemplary embodiment, mixing the dry phase with the liquid phase may include mixing the dry phase with at least one of sodium stearate, potassium stearate, and calcium stearate with a concentration of the stearate between about 5 wt. % and about 40 wt. % of the weight of the dry phase. In an exemplary embodiment, mixing the dry phase with the liquid phase may include mixing the dry phase with at least one of sodium hydroxide, potassium hydroxide, calcium hydroxide, barium hydroxide, aluminum hydroxide, lithium hydroxide, cesium hydroxide, and magnesium hydroxide with a concentration of the alkali metal hydroxide between about 5 wt. % and about 40 wt. % of the weight of the dry phase. In an exemplary embodiment, mixing the dry phase with the liquid phase may include mixing the dry phase with at least one of sodium silicate and potassium silicate with a concentration between about 10 wt. % and about 50 wt. % of the weight of the dry phase.

In an exemplary embodiment, activating the dry phase may further include thermal activating the dry phase by heating the dry phase at a temperature between about 800° C. and about 1400° C. for a time period between about 1 hour and about 5 hours. In an exemplary embodiment, forming the amorphous bagasse ash may further include obtaining the amorphous bagasse ash with a particle size between about 20 nm and about 100 nm by nanosizing the amorphous bagasse ash using at least one of a chemical method and a mechanical method.

Other exemplary systems, methods, features, and advantages of the implementations will be or will become, apparent to one of ordinary skill in the art upon examination of the following figures and detailed description. It is intended that all such additional systems, methods, features, and advantages be included within this description and this summary, be within the scope of the implementations and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure describes an exemplary method for producing high-strength and ultra-high-strength geopolymer and hydraulic cement compositions from waste materials of sugar industry such as bagasse and waste lime mud. The exemplary method of the present disclosure may help in the reduction of environmental problems caused by bagasse and waste lime mud, preventing water contamination, underground and surface water resources pollution, soil and air pollution, and may help in easier and more efficient waste management. Also, the present disclosure describes an exemplary method for forming amorphous bagasse ash which is more reactive than conventional bagasse ash for forming Si—O—Al chains in polymeric monomers of the cement compositions. As a result, using the exemplary amorphous bagasse ash for producing concretes may significantly improve compressive strength of the concretes.

Figure 1A:
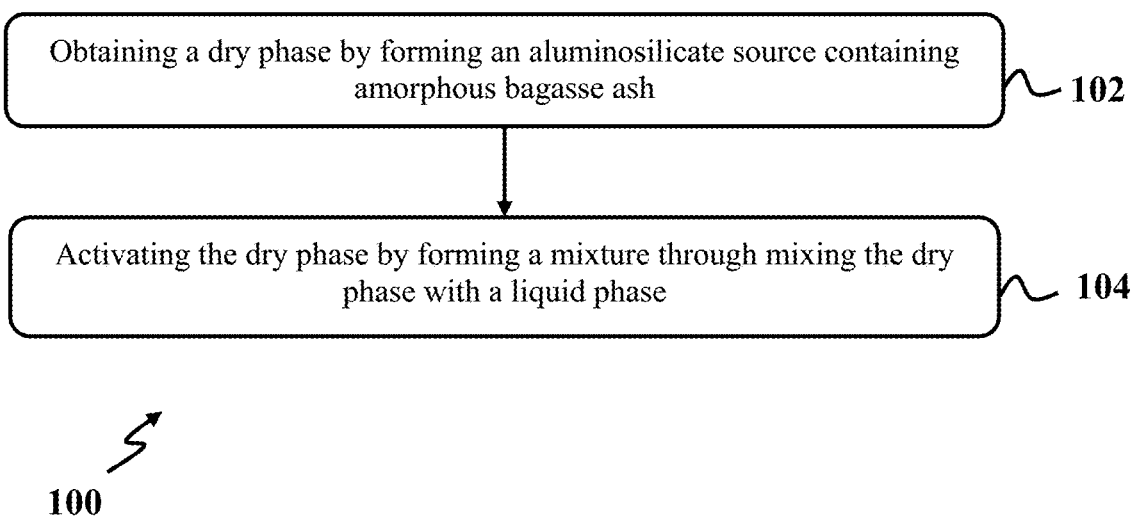
FIG. 1A illustrates a flowchart of an exemplary method for producing an exemplary cement composition based on amorphous bagasse ash, consistent with one or more exemplary of the present disclosure.

FIG. 1A shows a flowchart of an exemplary method 100 for producing an exemplary cement composition based on amorphous bagasse ash, consistent with one or more exemplary embodiments of the present disclosure. An exemplary method 100 may include obtaining a dry phase by forming an aluminosilicate source containing amorphous bagasse ash (step 102) and activating the dry phase by forming a mixture through mixing the dry phase with a liquid phase (step 104). In the present disclosure, "dry phase" may refer to a phase of an exemplary cement composition which includes dry materials such as an aluminosilicate source. In an exemplary embodiment, the dry phase may further include other dry materials, such as a carbonate and lime mud.

Figure 1B:
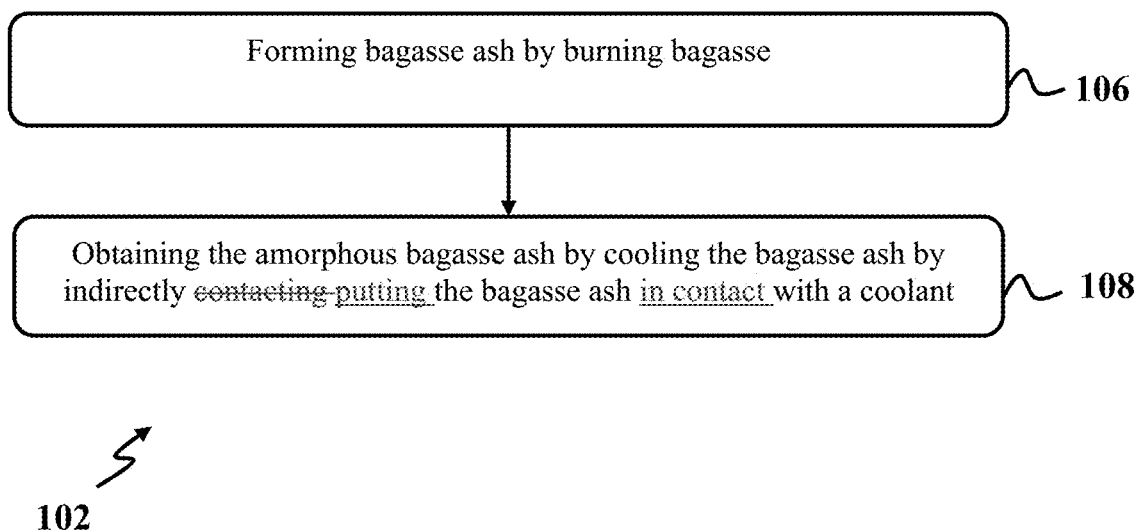
FIG. 1B illustrates a flowchart of an exemplary method for forming an aluminosilicate source containing amorphous bagasse ash, consistent with one or more exemplary of the present disclosure.

In further detail with respect to step 102, in an exemplary embodiment, obtaining a dry phase may include forming an aluminosilicate source containing amorphous bagasse ash with a concentration between about 40 wt. % and about 100 wt. % of the weight of the dry phase. In an exemplary embodiment, obtaining the dry phase may further include adding a carbonate to the aluminosilicate source. FIG. 1B illustrates a flowchart of an exemplary method for forming an aluminosilicate source containing amorphous bagasse ash, consistent with one or more exemplary of the present disclosure. Referring to FIG. 1B, the exemplary process may be similar to step 102 of method 100, where the exemplary process may comprise of forming bagase ash by burning bagasse (step 106), obtaining the amorphous bagasse ash by cooling the bagasse ash by indirectly putting the bagasseash in contact with a coolant (step 108).

In further detail with respect to step 106, in an exemplary embodiment, burning the bagasse may include burning the bagasse at a temperature between about 400° C. and about 1300° C. for a time period between about 1 hour and about 8 hours. In an exemplary embodiment, burning the bagasse may include burning the bagasse using at least one of an electric furnace or an ordinary furnace. In an exemplary embodiment, since the bagasse has a self-igniting property, burning the bagasse may be used for generating electricity at thermal power plants. As a result, producing the exemplary cement composition using the bagasse may become energy-producing instead of being an energy-consuming process.

In further detail with respect to step 108, in an exemplary embodiment, obtaining the amorphous bagasse ash may include cooling the bagasse ash by indirectly putting the bagasse ash in contact with a coolant. In the present disclosure, a "coolant" may refer to a substance, typically liquid or gas, that is used to reduce the temperature of the bagasse ash. In an exemplary embodiment, the coolant may be cold water with a temperature of about 0° C. In an exemplary embodiment, cooling the bagasse ash may include cooling the bagasse ash immediately after burning the bagasse by indirectly putting the bagasse ash in contact with a coolant which may cause the bagasse ash to become more amorphous and more reactive for forming Si—O—Al chains in polymeric monomers of the cement compositions. In an exemplary embodiment, indirectly putting the bagasse ash in contact with the coolant may include pouring the bagasse ash into a metal container and placing the metal container in contact with a coolant.

In an exemplary embodiment, the amorphous bagasse ash particles may be micronized using a mill. In an exemplary embodiment, the amorphous bagasse ash may have a particle size of less than 300 μm. In an exemplary embodiment, forming the amorphous bagasse ash may further include obtaining the amorphous bagasse ash with a particle size between about 20 nm and about 100 nm by nanosizing the amorphous bagasse ash using at least one of a chemical method and a mechanical method. In an exemplary embodiment, nanosizing the amorphous bagasse ash using a mechanical method may include nanosizing the amorphous bagasse ash using a planetary ball mill.

In an exemplary embodiment, the carbonate may include at least one of potassium carbonate, sodium carbonate, potassium bicarbonate, and sodium bicarbonate with a concentration between about 5 wt. % and about 35 wt. % of the weight of the dry phase. In an exemplary embodiment, obtaining the dry phase may further include adding lime mud to the aluminosilicate source with a weight ratio of the lime mud to the aluminosilicate source between about 40:60 and about 60:40. In an exemplary embodiment, adding lime mud to the aluminosilicate source ash may include adding waste lime mud to the aluminosilicate source. In an exemplary embodiment, the dry phase may include the amorphous bagasse ash, the lime mud, and the carbonate with a weight ratio of the amorphous bagasse ash:the lime mud:the carbonate between about 2:2:1 and about 5:3:2.

Referring back to FIG. 1A, in further detail with respect to step 104, in an exemplary embodiment, activating the dry phase may include forming a mixture through mixing the dry phase with a liquid phase. In an exemplary embodiment, the liquid phase may include at least one of water and an alkaline activator solution. In an exemplary embodiment, the alkaline activator solution may include at least one of an alkali metal stearate, an alkali metal silicate, and an alkali metal hydroxide. In an exemplary embodiment, mixing the dry phase with the liquid phase may include mixing the dry phase with the liquid phase with a weight ratio of the dry phase to the liquid phase between about 40%:60% and about 95%:5%.

In an exemplary embodiment, mixing the dry phase with the liquid phase containing the alkaline activator solution may lead to geopolymerization of the aluminosilicate source with the alkaline activator solution and formation of the geopolymer cement composition. In the present disclosure, a "geopolymer" may refer to inorganic alumina silicate materials derived from a combination of materials rich in silica and alumina with an alkaline activator solution. The alkaline activator solution, as one of the two main parts of geopolymers, plays an important role in decomposition and formation of the crystalline structure of Si and Al and is usually selected based on sodium or potassium, which are soluble alkaline metals. The most common alkaline solution used in geopolymerization is a combination of sodium hydroxide (NaOH) or potassium hydroxide (KOH) with a solution of sodium or potassium silicate.

In an exemplary embodiment, mixing the dry phase with the liquid phase may include mixing the dry phase with at least one of sodium stearate, potassium stearate, and calcium stearate with a concentration of the stearate between about 5 wt. % and about 40 wt. % of the weight of the dry phase. In the present disclosure, "sodium stearate" may refer to a sodium salt of stearic acid with a pH level of about 11 whose physical state is solid powder and is soluble in water, especially at temperatures above 60° C. Also, sodium stearate has both hydrophobic and hydrophilic parts. In an exemplary embodiment, the alkaline activator solution may include the alkali metal stearate and the alkali metal hydroxide with a weight ratio of the alkali metal stearate to the alkali metal hydroxide between about 0.5 and about 4.

In an exemplary embodiment, mixing the dry phase with the liquid phase may include mixing the dry phase with at least one of sodium hydroxide, potassium hydroxide, calcium hydroxide, barium hydroxide, aluminum hydroxide, lithium hydroxide, cesium hydroxide, and magnesium hydroxide with a concentration of the alkali metal hydroxide between about 5 wt. % and about 40 wt. % of the weight of the dry phase. In an exemplary embodiment, mixing the dry phase with the liquid phase may include mixing the dry phase with at least one of sodium silicate and potassium silicate with a concentration between about 10 wt. % and about 50 wt. % of the weight of the dry phase.

In the present disclosure, chemical activation of the dry phase may refer to activating the dry phase using the alkaline activator solution. In an exemplary embodiment, activating the dry phase may further include thermal activating the dry phase by heating the dry phase at a temperature between about 800° C. and about 1400° C. for a time period between about 1 hour and about 5 hours.

In an exemplary embodiment, the cement composition may further include an additive including at least one of a nanomaterial, natural and artificial pozzolans in nano and micro sizes, natural and synthetic fibers, resins, epoxies, plaster, stone powders, perlite, light aggregates, artificial aggregates, rubber and plastic powder, carbon particles, a rheology modifier, natural and artificial fillers, a polymeric adhesive, an emulsion adhesive, a rapid hardening additive, and a slow hardening additive. In an exemplary embodiment, the additive may be used in at least one form of powder, gel, solution, or colloid. In an exemplary embodiment, the exemplary cement may be mixed with other aluminosilicate sources, such as fly ash of class F and C, blast furnace slag, copper furnace slag, metakaolin, kaolin, zeolite, fine silica, mica, rice husk ash, bentonite, feldspar, basalt and agricultural ashes, pumice, and hydraulic cement compositions, such as Portland cement, calcium aluminate cement, and calcium sulfate cement.

In an exemplary embodiment, the exemplary cement composition may be used for producing concretes with high compressive strength and high-performance which is resistant to acidic conditions and corrosion. Accordingly, an exemplary cement composition may be used for in-situ construction of concretes and mortars in all concrete structures including residential, hydraulic, roads, oil structures, water pipes, sewage pipes, dams, bridges, tunnels, and all prefabricated concrete parts including pre-stressed, post-stressed, and ordinary cement blocks, ceramics, tiles, bricks, grouts, restorers, putty and mastics, shotcretes, autoclave concretes, epoxy concretes, self-compacting concretes, fiber concretes and mortars, lightweight concretes, fiber-reinforced plastic (FRP) concretes, concrete molds, concrete panels, sandwich panels, and concrete composite ceilings.

In an exemplary embodiment, exemplary concrete made of geopolymer cement based on bagasse ash may provide improved mechanical properties such as higher compressive strength than ordinary Portland concretes (OPCs). In an exemplary embodiment, exemplary concrete made of geopolymer cement based on bagasse ash may provide higher compressive strength compared to concretes made of metakaolin, zeolite, and kaolin geopolymers. In an exemplary embodiment, concrete and mortar made from exemplary cement of the present disclosure may be cured in at least one condition including at ambient temperature, dry curing conditions, steam curing conditions, curing conditions in water, curing conditions in hot water. In an exemplary embodiment, curing temperature may vary from ambient temperature to a temperature of about 180° C.

In an exemplary embodiment, exemplary concretes corresponding to an exemplary cement composition may be ultra-high-strength concretes with a compressive strength of about 120 MPa. In an exemplary embodiment, exemplary geopolymer and hydraulic cement may be used in the production of high-performance concrete with chemical resistance in acidic conditions with low water absorption. In an exemplary embodiment, exemplary geopolymer and hydraulic types of cement may be resistant in acidic conditions in terms of chemical resistance, permeability, and corrosion. In an exemplary embodiment, an exemplary cement composition may include waste material of bagasse ash and waste lime mud and may be classified as a green cement composition. In an exemplary embodiment, an exemplary cement composition may include waste material of bagasse ash and waste lime mud which may significantly reduce the cost of an exemplary cement composition.

EXAMPLES

Example 1: Compressive Strength of Cement Compositions Containing Different Types of Bagasse Ash In this example, different methods of ash making from bagasse for producing amorphous bagasse ash were examined. At first, bagasse ash was formed by burning bagasse in an electric furnace at a temperature of about 800° C. for a time period of about 2 hours. After burning the bagasse, the bagasse ash was cooled using three different methods including gradual and spontaneous cooling, water quenching, and immediately cooling without direct contact with a coolant.

In the gradual and spontaneous cooling method, the bagasse is set aside after burning to slowly cool down. However, the resulting bagasse ash obtained using the spontaneous cooling method is completely crystalline with very low reactivity. In the water quenching method, the bagasse ash is poured into the water, or water is sprayed into the bagasse ash. Although the resulting bagasse ash obtained using the water quenching method is slightly more amorphous than the resulting bagasse ash obtained using the spontaneous cooling method, it still has a crystalline structure.

In the third method which is immediately cooling without direct contact with a coolant, the bagasse ash is poured into a metal container and the container is placed in cold water for cooling the bagasse ashes without contact with water. As a result, the resulting bagasse ash obtained using the cooling method without direct contact with the coolant, the bagasse ash becomes significantly more amorphous and more reactive which solves the technical problem of bagasse ash. Subsequently, the bagasse ash was sieved by American society for testing and materials (ASTM) standard sieve with a mesh size 100 for producing the concrete.

TABLE 1 represents the results of the X-ray fluorescence (XRF) analysis of the bagasse ash. LOI refers to the loss on ignition of the bagasse ash. Loss on ignition of a raw material, cement or a clinker sample is the amount of weight lost through raising the temperature of the material to a predetermined level. As an indicator LOI may be used to monitor and improve the quality of the final product. Referring to TABLE 1, the XRF analysis indicates that the bagasse ash contained acceptable amounts of $SiO_2$, $Al_2O_3$, and CaO which makes the bagasse ash as a potential aluminosilicate source for producing exemplary geopolymer and hydraulic cement compositions.

TABLE 1

| XRF analyze of bagasse ash | | | | | | | | | | | |
|---|---|---|---|---|---|---|---|---|---|---|---|
| $SiO_2$ | $Al_2O_3$ | CaO | $Na_2O$ | $K_2O$ | MgO | MnO | $TiO_2$ | $P_2O_5$ | $Fe_2O_3$ | $SO_3$ | LOI |
| 44.9 | 4.6 | 15.2 | 1.5 | 4.4 | 3.5 | 0.2 | 0.3 | 1 | 3.4 | 5.1 | 14.2 |

Figure 2:
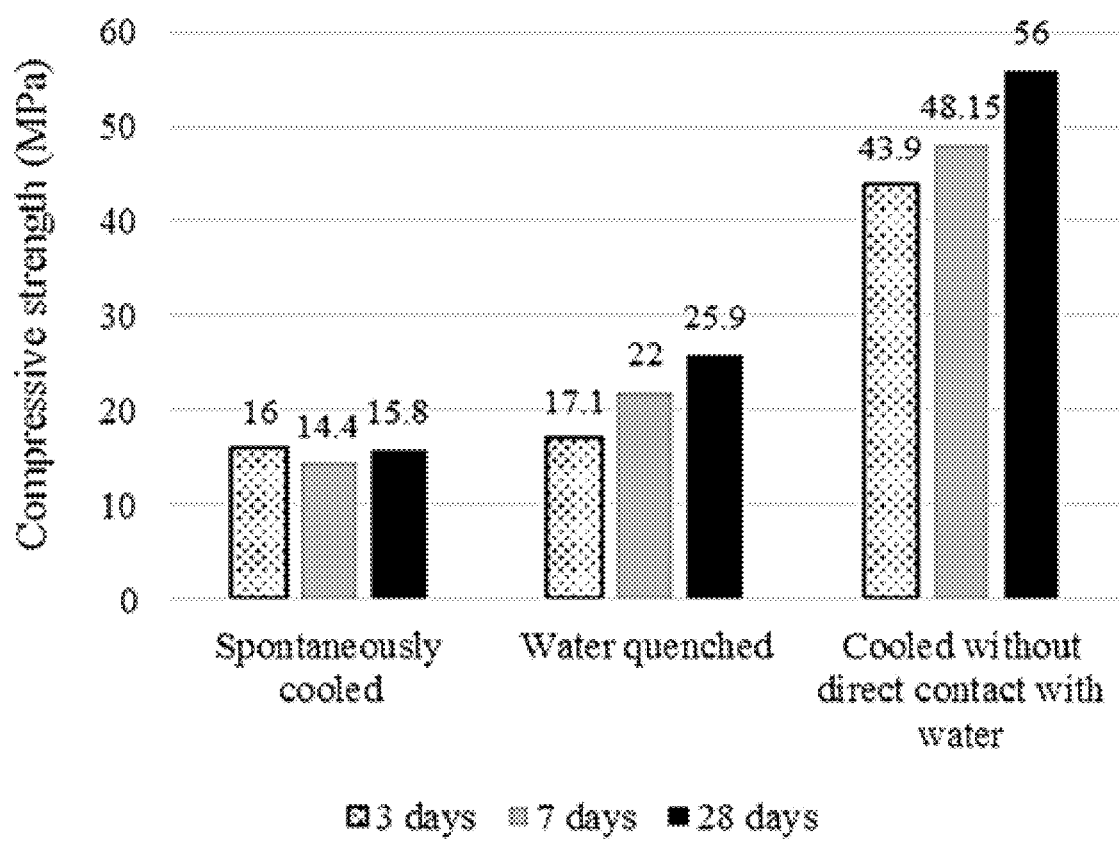
FIG. 2 illustrates the result of a compressive strength test of geopolymer concretes produced using different cooling methods of bagasse ash, consistent with one or more exemplary of the present disclosure.

FIG. 2 illustrates the result of a compressive strength test of geopolymer concretes produced using different cooling methods of bagasse ash, consistent with one or more exemplary of the present disclosure. Referring to FIG. 2, the geopolymer concretes produced using the cooling method without direct contact with water as the coolant showed a compressive strength of about 264% and about 117% higher than the compressive strength of the concretes produced by the spontaneous cooling method and water quenching method, respectively.

Example 2: An Exemplary High Strength Hydraulic Cement Containing Amorphous Bagasse Ash and Potassium Carbonate (Type 1)

In this example, an exemplary high strength hydraulic cement composition, named as cement composition type 1, was produced. The exemplary high strength hydraulic cement composition included a dry phase containing potassium carbonate (PC) with a concentration of less than 15% of the weight of the dry phase and an aluminosilicate source containing the amorphous bagasse ash with a concentration between 85% and about 100% of the weight of the dry phase. While water cannot activate the aluminosilicate source containing only the amorphous bagasse ash, concrete formation from the aluminosilicate source containing only the amorphous bagasse ash fails; therefore, potassium carbonate is added to the cement composition for subsequent activation of the amorphous bagasse ash.

As a result of adding potassium carbonate to the cement composition, whenever water is added to the cement composition type 1, potassium carbonate is dissolved in water and activates the amorphous bagasse ash. Also, the reason for using potassium carbonate instead of sodium carbonate is the higher solubility of potassium carbonate in water. Therefore, a higher concentration of potassium carbonate can be obtained in comparison with the sodium carbonate to activate the amorphous bagasse ash and, consequently, to achieve concretes with higher compressive strength.

After forming the cement composition type 1, corresponding concrete was formed as follows. At first, concrete mix design was selected according to TABLE 2. In the Mix ID section, "B" refers to amorphous bagasse ash, "PC" refers to potassium carbonate, and "SP" refers to superplasticizer. The unit of the numbers is kg per cubic meters of concrete ($Kg/m^3$). The coarse aggregates were a crushed aggregate type and graded with an ASTM standard sieve. Also, the fine aggregate was a river sand type and the fineness modulus of sand was about 3.2913.

In order to examine and compare the concretes corresponding to the cement composition type 1 with the OPC concrete, a control concrete was produced using 100% OPC instead of amorphous bagasse ash with the same mix design. Different mixtures were formed according to the mix designs of TABLE 2 by mixing dry materials of each of the mix designs including the cement composition type 1, coarse aggregates, and fine aggregates for a time period of about 2 minutes. Also, water and a superplasticizer (SP) with a concentration of about 2% of the weight of the dry phase were mixed with the dry materials for a time period of about 3 minutes. Then, the mixtures were condensed, formatted by the ASTM standard. In the end, the mixtures were cured at a temperature of about 65° C. for a time period of about 3 days and placed at ambient temperature.

TABLE 2

| | Mix design of concretes corresponding to cement composition type 1 and a control concrete | | | | | | |
|---|---|---|---|---|---|---|---|
| Mix ID | Cement type 1 | OPC | Coarse aggregate (10 mm) | Coarse aggregate (7 mm) | Fine aggregate | Water | SP |
| B | 400 | — | 450 | 450 | 900 | 200 | 8 |
| B-PC5% | 400 | — | 450 | 450 | 900 | 200 | 8 |

TABLE 2-continued

Mix design of concretes corresponding to cement composition type 1 and a control concrete

| Mix ID | Cement type 1 | OPC | Coarse aggregate (10 mm) | Coarse aggregate (7 mm) | Fine aggregate | Water | SP |
|---|---|---|---|---|---|---|---|
| B-PC10% | | | | | | | |
| B-PC15% | | | | | | | |
| Control | — | 400 | 450 | 450 | 900 | 200 | 8 |

Figure 3A:
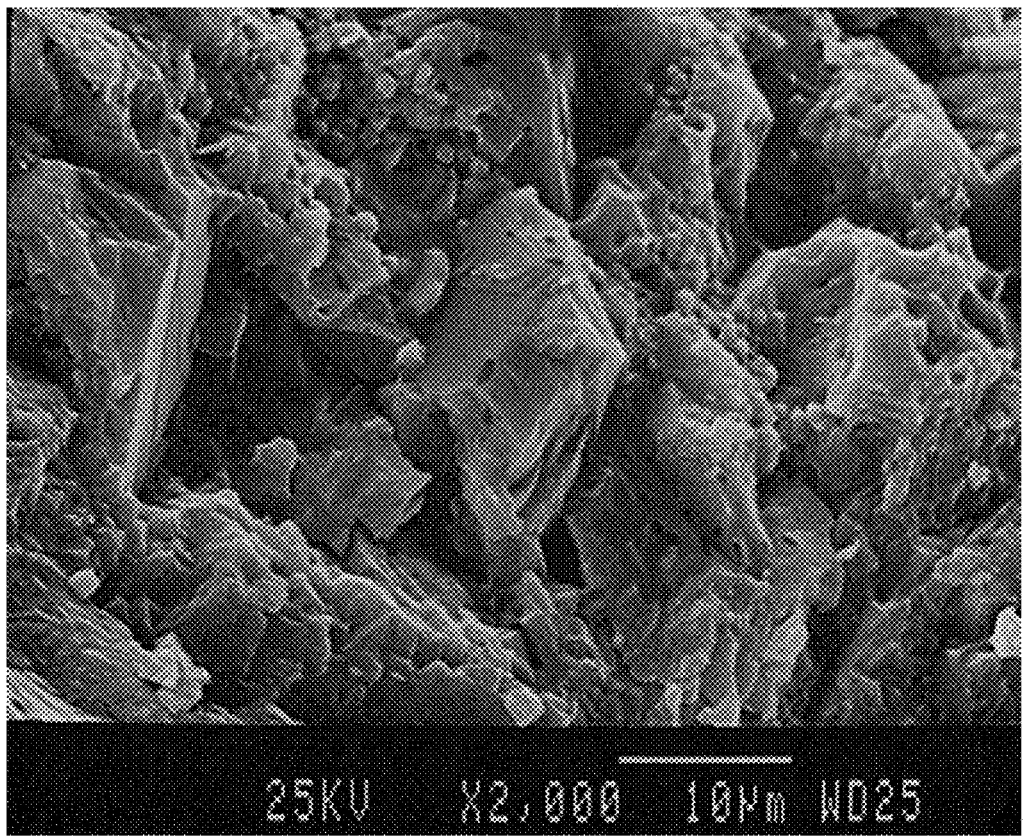
FIG. 3A illustrates a scanning electron microscopy (SEM) image of a hydraulic concrete corresponding to exemplary cement composition type 1 containing amorphous bagasse ash and potassium carbonate, consistent with one or more exemplary of the present disclosure.

FIG. 3A illustrates a scanning electron microscopy (SEM) image of a hydraulic concrete corresponding to exemplary cement composition type 1 containing amorphous bagasse ash and potassium carbonate with a concentration of about 15%, consistent with one or more exemplary of the present disclosure. Referring to FIG. 3A, the hydraulic concrete corresponding to exemplary cement composition type 1 has a dense structure with low porosity which indicates the complete dissolution of the amorphous bagasse ash particles in the exemplary cement composition. Also, the dense structure with low porosity of the hydraulic concrete corresponding to exemplary cement composition type 1 is the reason of higher compressive strength of the concrete corresponding to exemplary cement composition type 1 in comparison with a sample corresponding to a cement composition containing the amorphous bagasse ash and water without potassium carbonate. Moreover, the hydraulic concrete corresponding to exemplary cement composition type 1 has a plate-like structure containing calcium silicate hydrate (C—H—S) gel which is similar to the structure of ordinary Portland concretes (OPCs) and is completely different with the structure of geopolymer concretes.

Figure 3B:
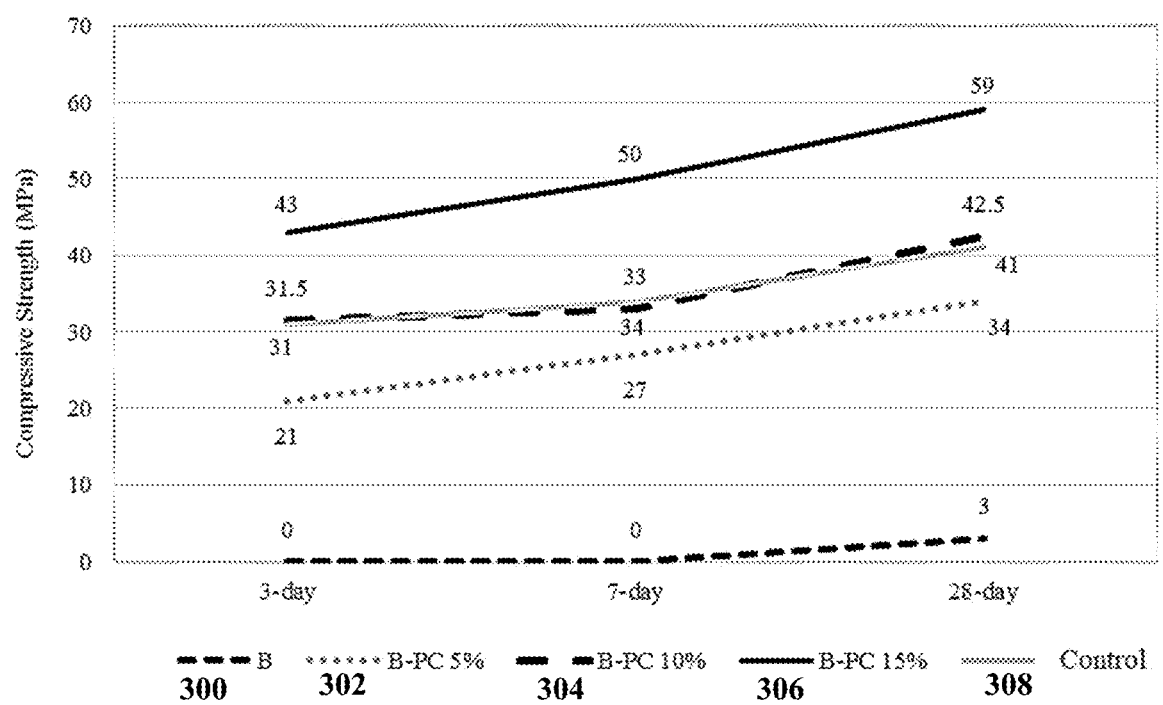
FIG. 3B illustrates the result of a compressive strength test of hydraulic concretes corresponding to cement composition type 1 containing amorphous bagasse ash with different concentrations of potassium carbonate and a control concrete, consistent with one or more exemplary of the present disclosure.

FIG. 3B illustrates the result of a compressive strength test of hydraulic concretes corresponding to cement composition type 1 containing amorphous bagasse ash with different concentrations of potassium carbonate (300-306) and a control concrete (308), consistent with one or more exemplary of the present disclosure. Referring to FIG. 3B, the 28-day compressive strength of the concrete B-PC15% 306 is significantly higher than the 28-day compressive strength of the control concrete 308. Also, the 28-day compressive strength of the concrete corresponding to the cement composition type 1 reaches from 3 MPa for concrete B 300 to 59 MPa for concrete B-PC15% 306 which means an increase of more than 19 times in compressive strength.

Figure 3C:
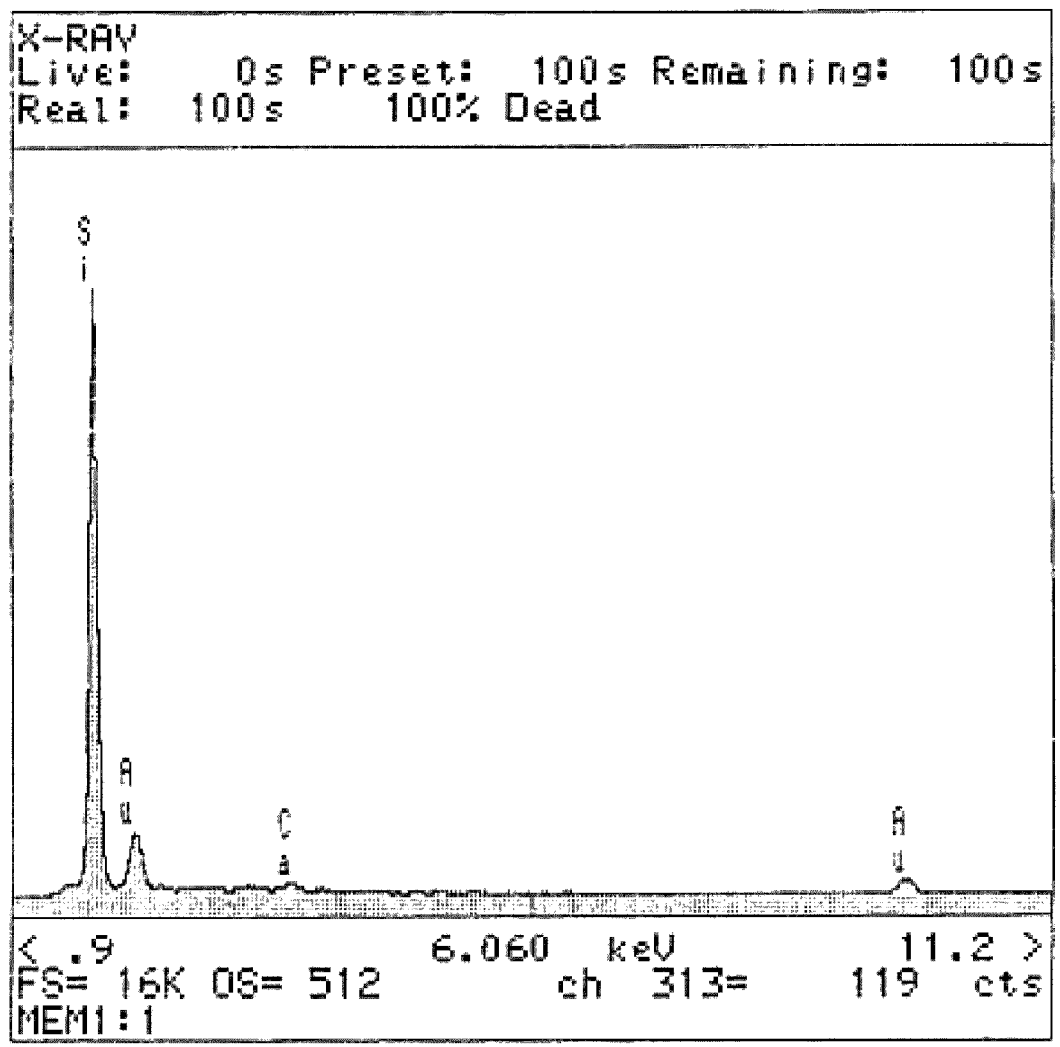
FIG. 3C illustrates an energy-dispersive X-ray spectroscopy (EDX) image of a hydraulic concrete corresponding to exemplary cement composition type 1 containing amorphous bagasse ash and potassium carbonate, consistent with one or more exemplary of the present disclosure.

FIG. 3C illustrates an energy-dispersive X-ray spectroscopy (EDX) image of a hydraulic concrete corresponding to exemplary cement composition type 1 containing amorphous bagasse ash and potassium carbonate with a concentration of about 15%, consistent with one or more exemplary of the present disclosure. Referring to FIG. 3C, the EDX analysis indicates the phases of gel formation in the cement composition which are similar to ordinary Portland concretes (OPC) and hydraulic concreters in terms of exemplary cement components and their ratios. The concrete corresponding to exemplary cement composition type 1 has a compressive strength of about 59 MPa and a sample corresponding to a cement composition containing the amorphous bagasse ash and water without potassium carbonate has a compressive strength of about 3 MPa. According to the results, the ratio the Si to Ca is high and about 22.4 may be the reason of the higher compressive strength of the concrete corresponding to exemplary cement composition type 1 in comparison with a concrete sample corresponding to a cement composition containing the amorphous bagasse ash and water without potassium carbonate. Therefore, potassium carbonate has a significant role in providing high compressive strength in the corresponding concretes.

Example 3: An Exemplary High-Performance Geopolymer Cement Composition Containing Amorphous Bagasse Ash and an Alkaline Activator Solution (Type 2)

In this example, an exemplary high-performance geopolymer cement composition containing amorphous bagasse ash and an alkaline activator solution, named as cement composition type 2, is produced. The exemplary geopolymer cement composition included a dry phase containing an aluminosilicate source containing amorphous bagasse ash with a concentration of 100 wt. % of the weight of the dry phase, and a liquid phase containing an alkaline activator solution. However, the alkaline activator solution of the cement composition type 2 differs from the alkaline activator solution of the conventional geopolymer cement compositions which includes a silicate solution. In the alkaline activator solution of the cement composition type 2, a stearate solution is used instead of the silicate solution, which results in high chemical resistance, permeability, and low water absorption.

Exemplary cement composition type 2 was produced through the following steps: At first, a sodium stearate solution with a concentration of about 35 wt. % was prepared by mixing sodium stearate and water in a container and heating the container in an oven up to a temperature of about 80° C. for a time period of about 2 hours. The container containing the sodium stearate and water was shaken several times during this time and placed again in the oven to completely dissolve the sodium stearate in water and obtain a clear solution, almost in a gelatin form. The stearate solution was then allowed to cool down for 1 day.

After preparing the sodium stearate solution, a solution of sodium hydroxide with a concentration of about 14 M (approximately 40 wt. %) was also prepared. The alkaline activator solution of the cement composition type 2 is a mixture of a sodium stearate solution and a sodium hydroxide solution with a weight ratio of 1:1. Then, concretes corresponding to the cement composition type 2 were formed according to mix designs of TABLE 3. In the Mix ID section, "SP" refers to superplasticizer. The unit of the numbers is kg per cubic meters of concrete (Kg/m$^3$). The coarse aggregates were a crushed aggregate type and graded with an ASTM standard sieve. Also, the fine aggregate was a river sand type and the fineness modulus of sand was about 3.2913.

In order to examine and compare the concretes corresponding to the cement composition type 2 with the OPC concrete, a control concrete was produced using 100% OPC instead of amorphous bagasse ash with the same mix design. Different mixtures were formed according to the mix designs of TABLE 3 by mixing dry materials of each of the mix designs including the cement composition type 2, coarse aggregates, and fine aggregates for a time period of about 2 minutes. Also, a superplasticizer (SP) with a concentration of about 2% of the weight of the dry phase, the alkaline activator solution, and water were mixed with the dry materials for a time period of about 3 minutes. Then, the mixtures were condensed, formatted by the ASTM standard. In the end, the mixtures were cured at a temperature of about 90° C. for a time period of about 24 hours. After the end of curing, samples were taken out from the oven and placed at ambient temperature to reach 28 days of age. At the end of 28 days, the absorption and chemical resistance tests were taken from the concretes.

TABLE 3

Mix design of concretes corresponding to cement composition type 2 and a control concrete

| Mix ID | Amorphous Bagasse ash | OPC | Coarse aggregate (10 mm) | Coarse aggregate (7 mm) | Fine aggregate | NaOH solution | Sodium stearate solution | Water | SP |
|---|---|---|---|---|---|---|---|---|---|
| Type 2 | 400 | — | 450 | 450 | 900 | 100 | 100 | — | 8 |
| Control | — | 400 | 450 | 450 | 900 | — | — | 200 | 8 |

Also, a 3-day water absorption test was performed according to the ASTM C642 standard by placing the concrete in the oven at a temperature of about 105° C. to dry completely and then weighing the concrete. Then, the concretes were placed in water for 3 days. After completing the experiment, the percentage of water absorption was calculated for each concrete as follows. The concretes were taken out from the water and their surfaces were dried with a napkin and weighed again. The percentage of water absorption is obtained from the equation 1 (Eq. 1), where P is the percentage of water absorption, m is the weight of the wet sample and $m_0$ is the weight of the dry sample.

$$P = \frac{m - m0}{m0} \times 100 \quad \text{(Eq. 1)}$$

In order to test the chemical resistance of the concretes, each concrete was placed in a sulfuric acid solution at pH equal to 1 for 28 days. Then, the compressive strength and weight loss tests were taken from the concretes and compared to the concrete that was not put in the acidic solution (control group) to measure the weight loss (corrosion) and the reduction of compressive strength. The concrete corresponding to cement composition type 2 has a compressive strength of about 57 MPa and can be classified in the category of high strength concretes.

Figure 4:
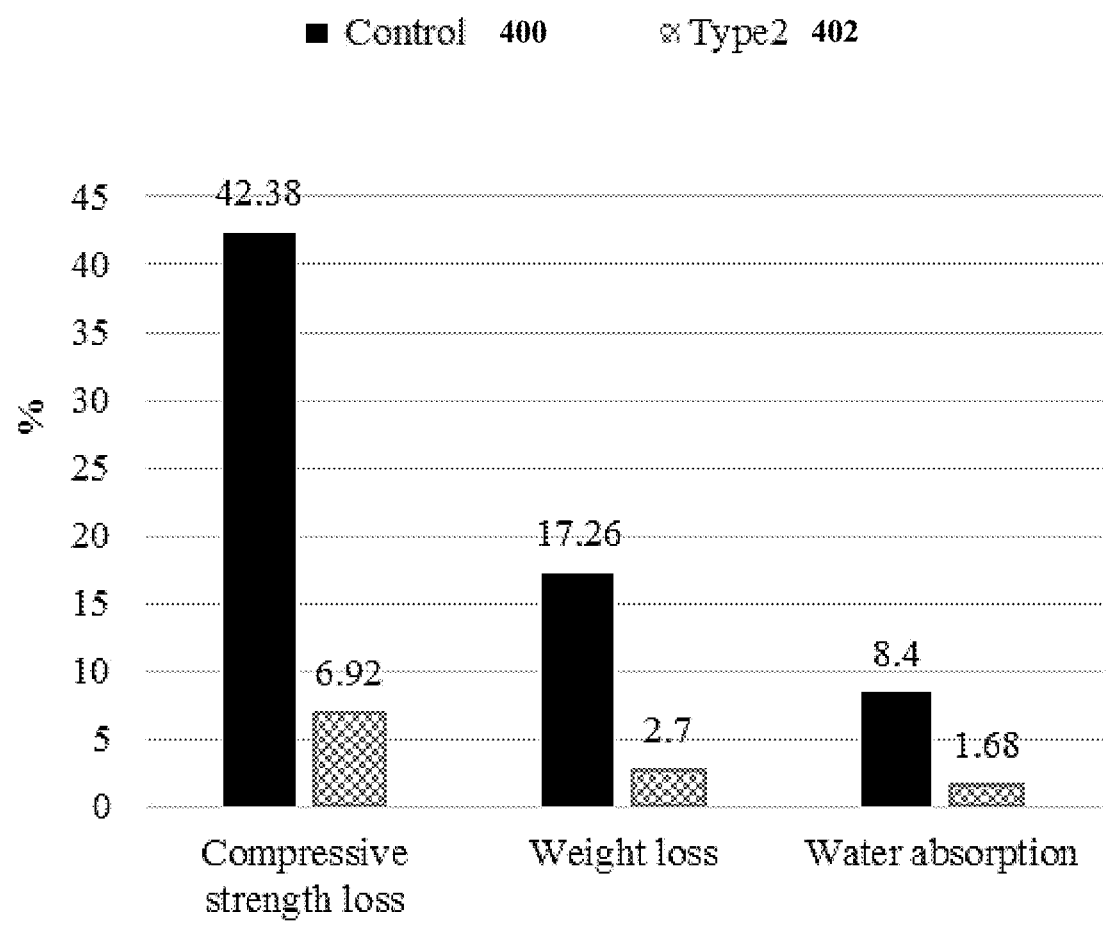
FIG. 4 illustrates the results of compressive strength, weight loss, and water absorption tests of a control concrete and a concrete corresponding to exemplary cement composition type 2 containing amorphous bagasse ash, sodium stearate, and sodium hydroxide, consistent with one or more exemplary of the present disclosure.

FIG. 4 illustrates the results of compressive strength, weight loss, and water absorption tests of a control concrete and a concrete corresponding to exemplary cement composition type 2 containing amorphous bagasse ash, sodium stearate, and sodium hydroxide, consistent with one or more exemplary of the present disclosure. Referring to FIG. 4, the concrete 402 corresponding to cement composition type 2 has water absorption 5 times lower than the control concrete 400. Also, compressive strength reduction and weight loss (corrosion) of the concrete 402 corresponding to cement composition type 2 is about 6 times lower than compressive strength reduction and weight loss (corrosion) of the control concrete 400. As a result, chemical resistance of the concrete 402 corresponding to cement composition type 2 is 6 times higher than the control concrete 400.

Example 4: an Exemplary High Strength Geopolymer Cement Composition Containing Amorphous Bagasse Ash, Waste Lime Mud, and Potassium Carbonate (Type 3)

In this example, an exemplary water-activated geopolymer cement composition including a dry phase containing potassium carbonate (PC) and an aluminosilicate source containing amorphous bagasse ash and waste lime mud, named as cement composition type 3, was produced. Exemplary cement composition type 3 was produced by forming a mixture including amorphous bagasse ash, waste lime mud, and potassium carbonate with a weight ratio of the amorphous bagasse ash:the waste lime mud:potassium carbonate of about 40%:40%:20%.

After forming the exemplary cement composition type 3, thermal activation of exemplary cement composition type 3 was done by placing the mixture in an electric furnace at a temperature of about 1000° C. for a time period of about 2 hours. Then, the mixture was cooled down quickly to prevent the formation of the crystalline structures and to create reactive and amorphous materials. It should be noted that the presence and amount of the potassium carbonate, other components of the exemplary cement composition type 3 and their ratios, and thermal activation of the exemplary cement composition type 3 obviates the need for alkaline activator solutions for chemical activations of the aluminosilicate source of the geopolymer cement compositions. Therefore, only water is needed for the formation of the concretes without any need for alkaline activator solutions and concrete corresponding to exemplary cement composition type 3 is water-activated.

After thermal activation of the exemplary cement composition type 3 concretes corresponding to the cement composition type 3 were formed according to mix designs of TABLE 4. In the Mix ID section, "SP" refers to superplasticizer, "BL-W" refers to the concrete corresponding to exemplary cement composition type 3, "B" refers to amorphous bagasse ash, "L" refers to waste lime mud, and "W" refers to activation with water. The unit of the numbers is kg per cubic meters of concrete (Kg/m³). The coarse aggregates were a crushed aggregate type and graded with an ASTM standard sieve. Also, the fine aggregate was a river sand type and the fineness modulus of sand was about 3.2913.

In order to examine and compare the concretes corresponding to the cement composition type 3 with the OPC concrete, a control concrete was produced using 100% OPC instead of amorphous bagasse ash with the same mix design. Different mixtures were formed according to mix designs of TABLE 4 by mixing dry materials of each of the mix designs including the cement composition type 3, coarse aggregates, and fine aggregates for a time period of about 2 minutes. Also, water and a superplasticizer (SP) with a concentration of about 2% of the weight of the dry phase were mixed with the dry materials for a time period of about 3 minutes. Then, the mixtures were condensed, formatted by the ASTM standard. In the end, the mixtures were cured at a temperature of about 65° C. for a time period of about 3 days. After the end of curing, samples were taken out from the oven and placed at ambient temperature to reach 28 days of age. At the end of 28 days, the absorption and chemical resistance tests were taken from the concretes.

TABLE 4

Mix design of concrete corresponding to cement composition type 3 and a control concrete

| Mix ID | Type 3 cement | OPC | Coarse aggregate (10 mm) | Coarse aggregate (7 mm) | Fine aggregate | Water | SP |
|---|---|---|---|---|---|---|---|
| BL-W | 400 | — | 450 | 450 | 900 | 200 | 8 |
| Control | — | 400 | 450 | 450 | 900 | 200 | 8 |

Figure 5:
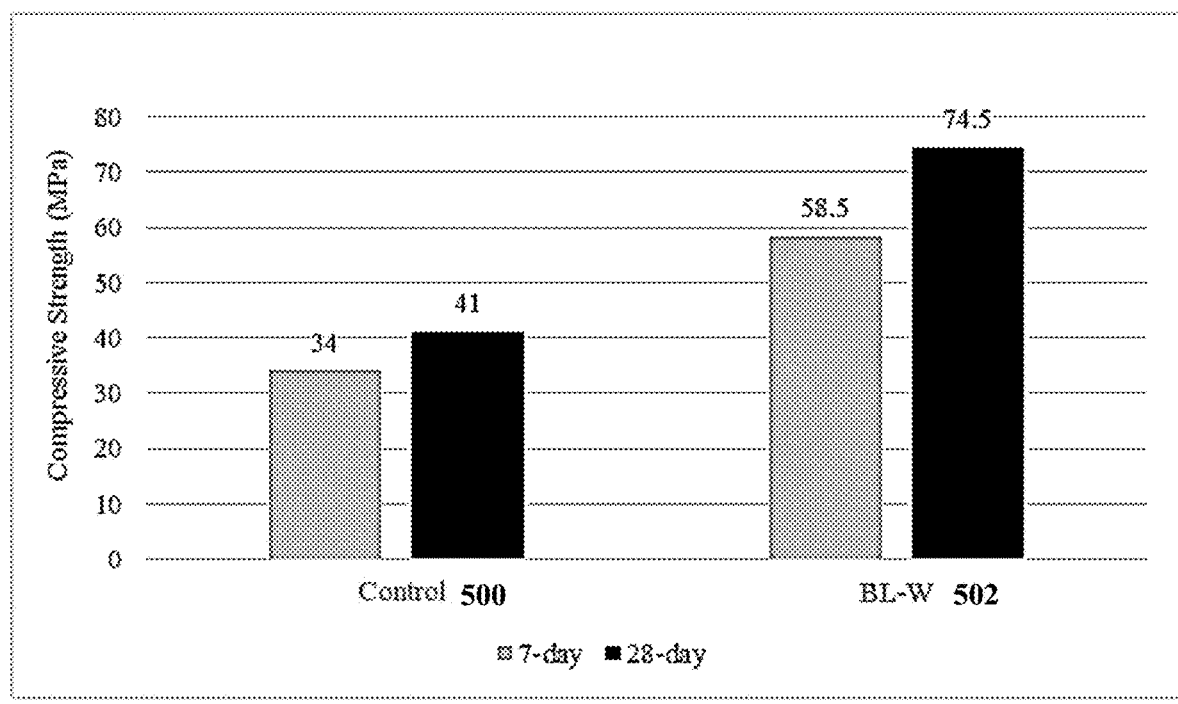
FIG. 5 illustrates the results of a compressive strength test of a control concrete and a concrete corresponding to exemplary cement composition type 3 containing amorphous bagasse ash, lime mud, and potassium carbonate, consistent with one or more exemplary of the present disclosure.

FIG. 5 illustrates the results of a compressive strength test of a control concrete (OPC 500) and a concrete corresponding to exemplary cement composition type 3 (BL-W 502) containing amorphous bagasse ash, lime mud, and potassium carbonate, consistent with one or more exemplary of the present disclosure. Referring to FIG. 5, concrete 502 corresponding to cement composition type 3 has a 28-day strength of about 74.5 MPa without strength enhancement additives, such as nanosilica and fibers, and is classified as a high strength concrete. The compressive strength of the concrete 502 corresponding to cement composition type 3 is significantly higher than the compressive strength of the control concrete 500.

Example 5: An Exemplary Ultra-High-Strength Geopolymer Cement Composition Containing Amorphous Bagasse Ash, Waste Lime Mud, Potassium Carbonate, and an Alkaline Activator Solution (Type 4)

In this example, an exemplary ultra-high-strength geopolymer cement composition containing amorphous bagasse ash, waste lime mud, and potassium carbonate, named as cement composition type 4, was produced. Exemplary cement composition type 4 was produced by forming a mixture including amorphous bagasse ash, waste lime mud, and potassium carbonate with a weight ratio of the amorphous bagasse ash:the waste lime mud:potassium carbonate of about 50%:30%:20%.

The aluminosilicate source of the exemplary cement composition type 4 was activated using a thermal-chemical activation process. Thermal activation of exemplary cement composition type 3 was done by placing the mixture in an electric furnace at a temperature of about 1000° C. for a time period of about 2 hours. Then, the mixture was cooled down quickly to prevent the formation of the crystalline structures and to create reactive and amorphous materials. In order to chemically activate the aluminosilicate source of the exemplary cement composition type 4, a sodium silicate solution with a concentration of about 44.5 wt. % and a sodium hydroxide solution with a concentration of about 14 M was used as an alkaline activator solution of the cement composition type 4. The sodium silicate solution had a ratio of sodium oxide to silica oxide of about 2. The alkaline activator solution the cement composition type 4 included the sodium silicate solution and the sodium hydroxide solution with a weight ratio of the sodium silicate solution to the sodium hydroxide solution of about 2:3.

After activating the exemplary cement composition type 4, concretes corresponding to the cement composition type 4 were formed according to mix designs of TABLE 5. In Mix ID section, "SP" refers to superplasticizer, "BL-A" refers to the concrete corresponding to exemplary cement composition type 4, "B" refers to amorphous bagasse ash, "L" refers to waste lime mud, and "A" refers to activation with the alkaline activator solution. The unit of the numbers is kg per cubic meters of concrete (Kg/m$^3$). The coarse aggregates were a crushed aggregate type and graded with an ASTM standard sieve. Also, the fine aggregate was a river sand type and the fineness modulus of sand was about 3.2913.

In order to examine and compare the concretes corresponding to the cement composition type 4 with the OPC concrete, a control concrete was produced using 100% OPC instead of amorphous bagasse ash with the same mix design. Different mixtures were formed according to the mix designs of TABLE 5 by mixing dry materials of each of the mix designs including the cement composition type 4, coarse aggregates, and fine aggregates for a time period of about 2 minutes. Also, a superplasticizer (SP) with a concentration of about 2% of the weight of the dry phase, the alkaline activator solution, and water were mixed with the dry materials for a time period of about 3 minutes. Then, the mixtures were condensed, formatted by the ASTM standard. In the end, the mixtures were cured at a temperature of about 90° C. for a time period of about 24 hours. After the end of curing, samples were taken out from the oven and placed at ambient temperature to reach 28 days of age.

TABLE 5

Mix designs of concretes corresponding to exemplary cement composition type 4 and a control concrete

| Mix ID | Type 4 cement | OPC | Coarse aggregate (10 mm) | Coarse aggregate (7 mm) | Fine aggregate | NaOH solution | Na$_2$SiO$_3$ solution | Water | SP |
|---|---|---|---|---|---|---|---|---|---|
| BL-A | 400 | — | 450 | 450 | 900 | 80 | 120 | — | 8 |
| Control | — | 400 | 450 | 450 | 900 | — | — | 200 | 8 |

Figure 6:
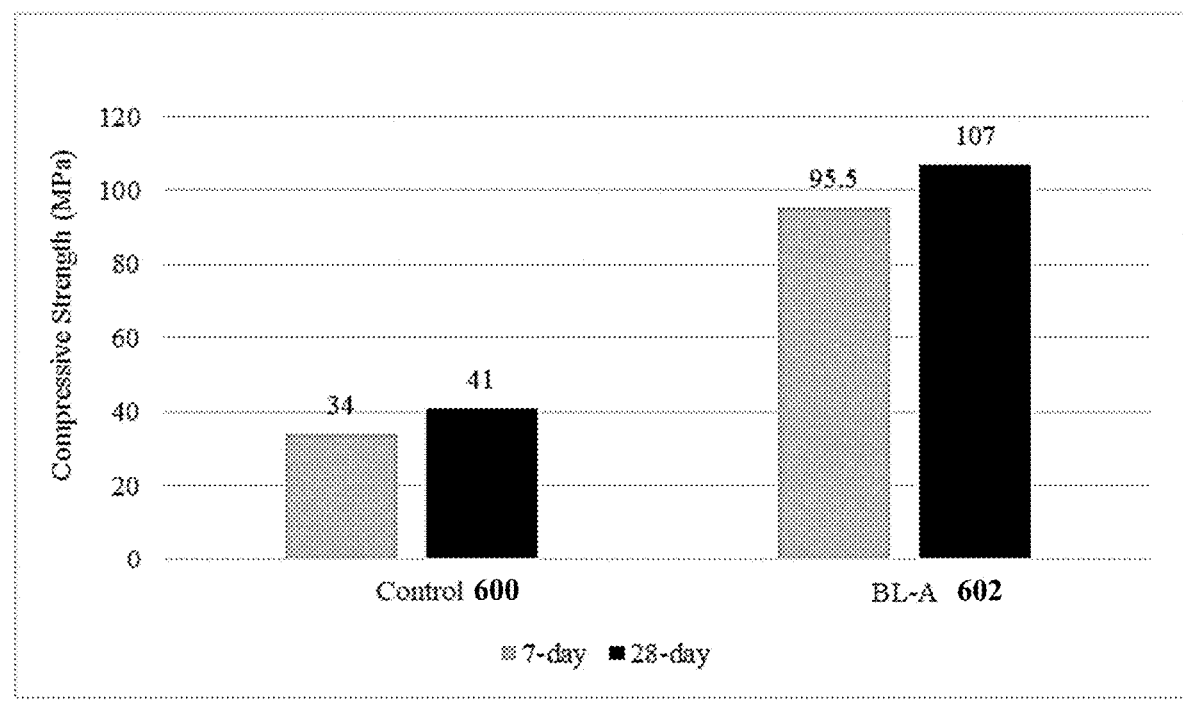
FIG. 6 illustrates the results of a compressive strength test of a control concrete and a concrete corresponding to exemplary cement composition type 4 containing amorphous bagasse ash, lime mud, and potassium carbonate, sodium silicate, and sodium hydroxide, consistent with one or more exemplary of the present disclosure.

FIG. 6 illustrates the results of a compressive strength test of a control concrete 600 and a concrete 602 corresponding to exemplary cement composition type 4 containing amorphous bagasse ash, lime mud, and potassium carbonate, sodium silicate, and sodium hydroxide, consistent with one or more exemplary of the present disclosure. Referring to FIG. 6, the concrete 602 corresponding to exemplary cement composition type 4 has a 28-day compressive strength of about 107 MPa without the use of any strength enhancement materials, such as nanomaterials, pozzolans, sodium fluoride, and fibers which indicates that the concrete corresponding to exemplary cement composition type 4 belongs to the category of ultra-high-strength concretes.

Comparison between compressive strength of the concrete 502 corresponding to exemplary cement composition type 3 and the concrete 602 corresponding to exemplary cement composition type 4 indicates that thermal activation and chemical activation of the exemplary cement composition type 4 considerably increases the compressive strength. Also, the concrete 602 corresponding to exemplary cement composition type 4 has a compressive strength almost 2 times higher than the compressive strength of the control concrete 600.

Example 6: An Exemplary Ultra-High Strength Nano Cement Composition Containing Amorphous Nanobagasse Ash and an Alkaline Activator Solution (Type 5)

In this example, an exemplary ultra-high-strength geopolymer nano cement composition, named as exemplary cement composition type 5, was produced. The exemplary ultra-high-strength geopolymer nano cement composition included a dry phase containing an aluminosilicate source containing amorphous nanobagasse ash with a concentration of 100 wt. % of the dry phase, and a liquid phase containing an alkaline activator solution. The alkaline activator solution of the cement composition type 5 included a mixture of a sodium silicate solution with a concentration of about 44.5 wt. % and a sodium hydroxide solution with a concentration of about 14 M with a weight ratio of the sodium silicate solution and the sodium hydroxide solution of about 1:1.5. The sodium silicate solution has a ratio of $SiO_2:Na_2O$ of about 2.

In order to form amorphous nanobagasse ash, nanosizing the amorphous bagasse ash was done using a planetary ball mill machine. The amorphous nanobagasse ash has a particle size between about 20 nm and about 100 nm. After forming the exemplary cement composition type 5, concretes corresponding to the cement composition type 5 were formed according to mix designs of TABLE 6. In the Mix ID section, "SP" refers to superplasticizer, B—N refers to the concrete corresponding to exemplary cement composition type 5, "B" refers to amorphous nanobagasse ash, and "N" refers to nanosized particles of the amorphous nanobagasse ash. The unit of the numbers is kg per cubic meters of concrete ($Kg/m^3$). The coarse aggregates were a crushed aggregate type and graded with an ASTM standard sieve. Also, the fine aggregate was a river sand type and the fineness modulus of sand was about 3.2913.

It should be noted that since the amorphous nanobagasse ash has a higher surface area to volume ratio, a smaller amount (less than a half) of amorphous nanobagasse ash and more alkaline activator solution was required for forming the concretes compared to amorphous bagasse ash with microparticles. In order to examine and compare the concretes corresponding to the cement composition type 5 with the OPC concrete, a control concrete was produced using 100% OPC instead of amorphous bagasse ash with the same mix design.

Different mixtures were formed according to the mix designs of TABLE 6 by mixing dry materials of each of the mix designs including the cement composition type 5, coarse aggregates, and fine aggregates for a time period of about 2 minutes. Also, the alkaline activator solution and a superplasticizer (SP) with a concentration of about 2% of the weight of the dry phase were mixed with the dry materials for a time period of about 3 minutes. Then, the mixtures were condensed, formatted by the ASTM standard. In the end, the mixtures were cured at a temperature of about 90° C. for a time period of about 24 hours. After the end of curing, samples were taken out from the oven and placed at ambient temperature to reach 28 days of age.

TABLE 6

Mix designs of a concrete corresponding to exemplary cement composition type 5

| Mix ID | Nano-bagasse ash | Coarse aggregate (10 mm) | Coarse aggregate (7 mm) | Fine aggregate | NaOH solution | $Na_2SiO_3$ solution | SP |
|---|---|---|---|---|---|---|---|
| B-N | 175 | 450 | 450 | 900 | 90 | 135 | 5 |

Figure 7:
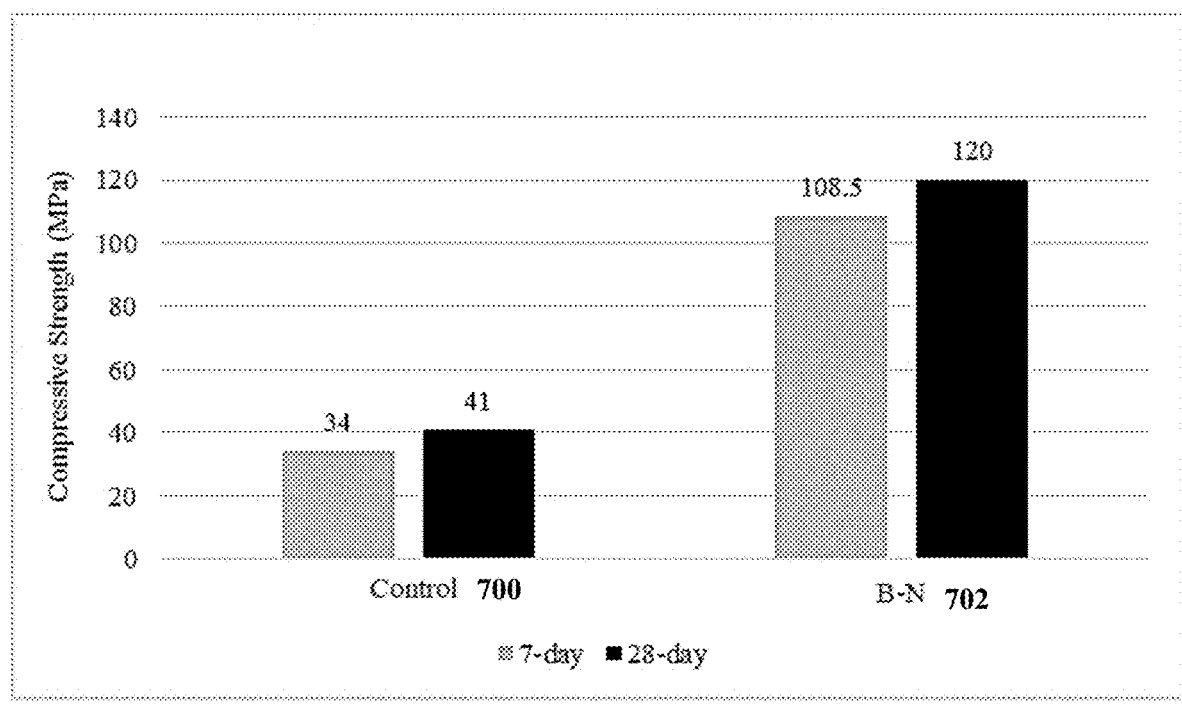
FIG. 7 illustrates the results of a compressive strength test of a control concrete and a concretes corresponding to exemplary cement composition type 5 containing amorphous nanobagasse ash, consistent with one or more exemplary of the present disclosure.

FIG. 7 illustrates the results of a compressive strength test of a concrete 702 corresponding to exemplary cement composition type 5 containing amorphous nanobagasse ash and a control concrete 700, consistent with one or more exemplary of the present disclosure. Referring to FIG. 7, concrete 702 corresponding to exemplary cement composition type 5 containing amorphous nanobagasse ash has the highest compressive strength of about 120 MPa without the use of any additive for increasing the compressive strength, such as aluminates, sodium fluoride, fibers, silica, high strength aggregates, and quartz powder. Therefore, concrete 702 corresponding to exemplary cement composition type 5 belongs to a category of ultra-high-strength concretes. Also, concrete 702 corresponding to exemplary cement composition type 5 containing amorphous nanobagasse ash has the highest compressive strength among the concretes based on bagasse ash.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such away. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, the inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A cement composition, comprising:
    a dry phase comprising an aluminosilicate source, the aluminosilicate source comprising amorphous bagasse ash with a concentration between 40 wt. % and 100 wt. % of weight of the dry phase; and
    a liquid phase comprising an alkaline activator solution, the alkaline activator solution comprising an alkali metal stearate.

2. The cement composition of claim 1, wherein the alkali metal stearate comprises at least one of sodium stearate, potassium stearate, and calcium stearate with a concentration of the stearate between 5 wt. % and 40 wt. % of weight of the dry phase.

3. The cement composition of claim 1, wherein the alkaline activator solution further comprises an alkali metal hydroxide, the alkali metal hydroxide comprises at least one of sodium hydroxide, potassium hydroxide, calcium hydroxide, barium hydroxide, aluminum hydroxide, lithium hydroxide, cesium hydroxide, and magnesium hydroxide with a concentration of the alkali metal hydroxide between 5 wt. % and 40 wt. % of weight of the dry phase.

4. The cement composition of claim 1, wherein the alkaline activator solution further comprises an alkali metal hydroxide with a weight ratio of the alkali metal stearate to the alkali metal hydroxide between 0.5 and 4.

5. The cement composition of claim 1, wherein the alkaline activator solution further comprises an alkali metal silicate, the alkali metal silicate comprises at least one of sodium silicate and potassium silicate with a concentration between 10 wt. % and 50 wt. % of weight of the dry phase.

6. The cement composition of claim 1, wherein the dry phase further comprises lime mud with a concentration between 25 wt. % and 55 wt. % of weight of the dry phase.

7. The cement composition of claim 6, wherein the dry phase further comprises a carbonate, the carbonate comprising at least one of potassium carbonate, sodium carbonate, potassium bicarbonate, and sodium bicarbonate with a concentration of the carbonate between 5 wt. % and 35 wt. % of weight of the dry phase.

8. The cement composition of claim 7, wherein the dry phase comprises the amorphous bagasse ash, the lime mud, and the carbonate with a weight ratio of the amorphous bagasse ash:the lime mud:the carbonate between 2:2:1 and 5:3:2.

9. The cement composition of claim 1, wherein the amorphous bagasse ash comprises nano-sized amorphous bagasse ash with a particle size between 20 nm and 100 nm.

10. The cement composition of claim 1, wherein the cement composition further comprises an additive, the additive comprising at least one of a nanomaterial, natural and artificial pozzolans, natural and synthetic fibers, resins, epoxies, plaster, stone powders, perlite, light and artificial aggregates, rubber and plastic powder, carbon particles, a rheology modifier, natural and artificial fillers, a polymeric adhesive, an emulsion adhesive, a rapid hardening additive, and a slow hardening additive.

11. A cement composition, comprising:
    a dry phase comprising an aluminosilicate source, the aluminosilicate source comprising amorphous bagasse ash with a concentration between 40 wt. % and 100 wt. % of weight of the dry phase; and
    a liquid phase comprising an alkaline activator solution, the alkaline activator solution comprising an alkali metal stearate and an alkali metal hydroxide.

12. The cement composition of claim 11, wherein the alkaline activator solution comprises the alkali metal stearate and the alkali metal hydroxide with a weight ratio of the alkali metal stearate to the alkali metal hydroxide between 0.5 and 4.

13. A cement composition, comprising:
    a dry phase comprising:
        an aluminosilicate source, the aluminosilicate source comprising amorphous bagasse ash with a concentration between 40 wt. % and less than 100 wt. % of weight of the dry phase; and
        a carbonate, the carbonate comprising at least one of potassium carbonate, sodium carbonate, potassium bicarbonate, and sodium bicarbonate with a concentration of the carbonate between 5 wt. % and 35 wt. % of weight of the dry phase; and
    a liquid phase comprising water without an alkaline activator solution, the alkaline activator solution comprising at least one of an alkali metal stearate, an alkali metal silicate, and an alkali metal hydroxide.

* * * * *